Patented May 7, 1946

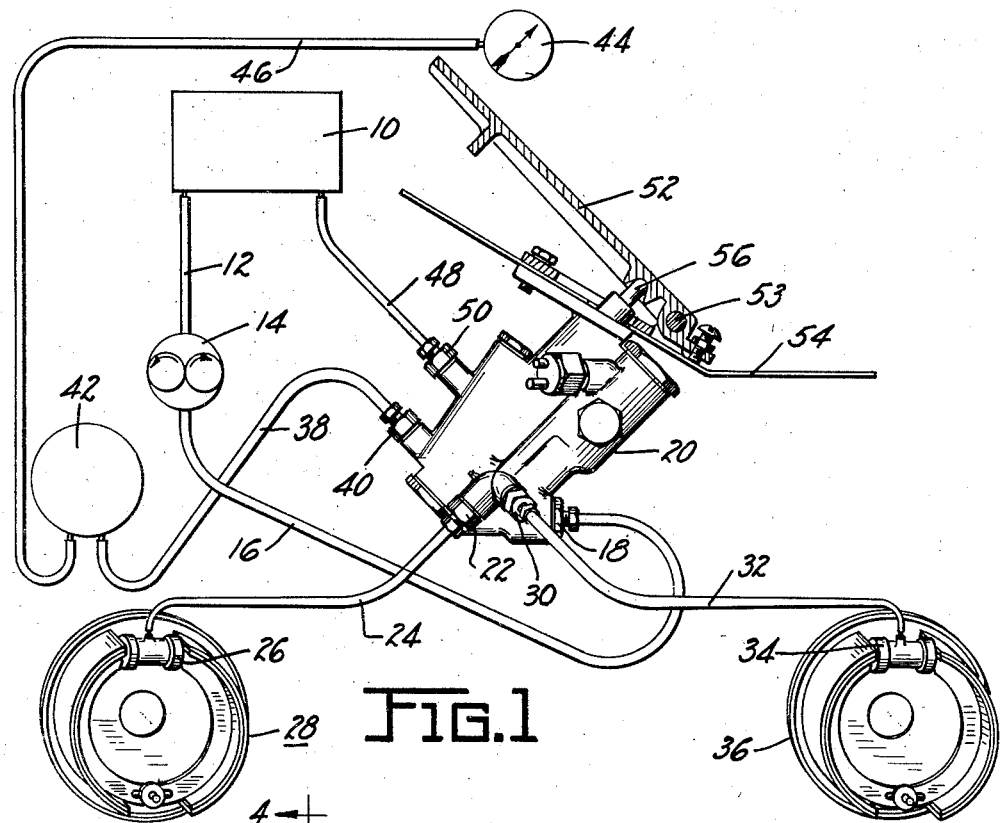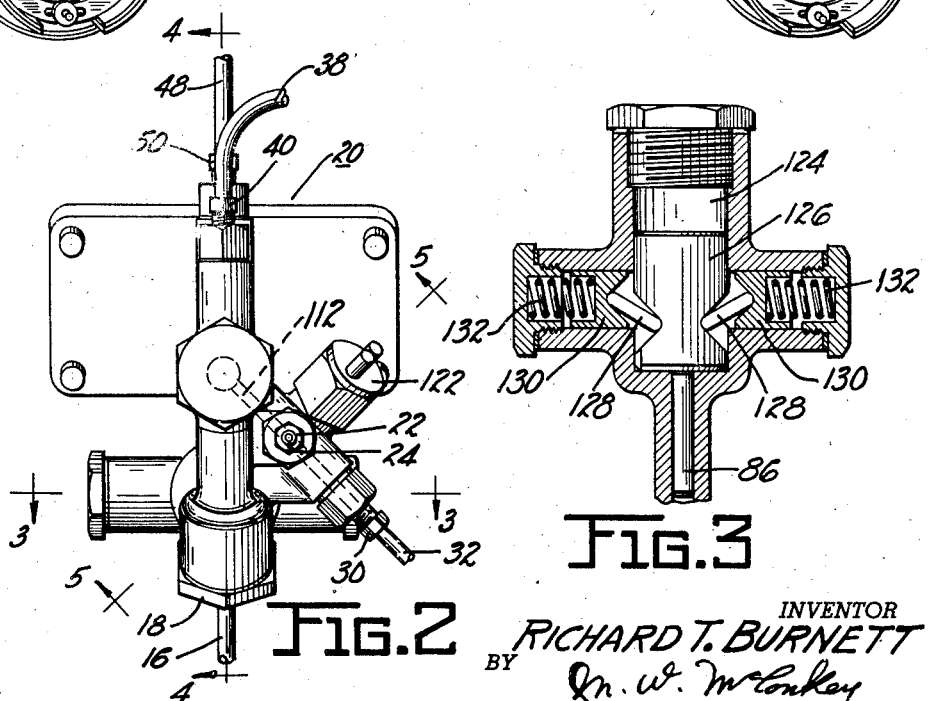

2,400,039

UNITED STATES PATENT OFFICE 2,400,039

ACCUMULATOR SYSTEM

Richard T. Burnett, South Bend, Ind.

Application February 19, 1942, Serial No. 431,511

14 Claims. (Cl. 60—51)

This invention relates to fluid pressure systems which may be utilized in operating various kinds of motors, and particularly to fluid pressure systems in which pressure fluid is accumulated and stored in advance of the use thereof.

My device contemplates the use of a pump or other power driven device for putting fluid under pressure, and an accumulator or storage tank in connection therewith for retaining the fluid which has been put under pressure until such time as the fluid is utilized in operating one or more motors. Wherever such a combination is used, a two-fold problem arises. First, sufficient pressure must be maintained in the accumulator to allow the immediate and effective operation of the motor or motors connected thereto when such operation is necessary. Second, an upper limit must be placed on the pressure that can be accumulated or stored. This second problem arises from the need to prevent overloading of the accumulator or storage tank.

Broadly, my invention comprehends the use of an accumulator to operate a fluid motor or motors, the use of a pressure creating pump to build up pressure in the accumulator, and the insertion of a valve device between the pump and accumulator which valve device is operable to open a by-pass conduit when the accumulator pressure rises to a certain predetermined amount and to close the said by-pass conduit whenever the fluid motor is operated from the accumulator. The by-pass conduit connects the pump to a fluid reservoir which is under atmospheric or normal pressure, and the pump therefore, whenever the by-pass is open, is operating under an extremely light load.

It is an object of my invention to provide, for operating one or more fluid pressure motors, an accumulator system in which the pump is permitted to run under light pressure or no pressure when a high pressure prevails in the accumulator, the said pump not being again placed under load until there has been an actuation of one of the fluid motors controlled or operated by the accumulator system.

Where a pump and accumulator combination is used, it is desirable to have the pump operating at low pressures whenever possible, in order to save wear and tear on the pump unit and in order to avoid generating unnecessary heat in the pump. To guarantee that a slight loss of pressure from the accumulator shall not reconnect the pump and accumulator and to guarantee that the relief valve may not be so balanced as to allow a slight by-passing sufficient to prevent the valve from being further opened but insufficient to relieve the load on the pump, I have provided control mechanism for the by-pass conduit which is subject to a snap action. When the pressure in the accumulator reaches the predetermined maximum amount, the by-pass conduit is completely opened and remains open until a substantial pressure is exerted from a direction opposed to the pressure which opened the by-pass. This snap action is accomplished by using spring loaded toggles which resist movement to open the by-pass and which likewise resist movement to close the by-pass until the dead center of the toggle mechanism has been passed.

Features of my invention include the use of several dashpots to prevent sharp and jarring movement of pistons, plungers and the like used in my device. A second feature is the use of an operating fluid wherever possible to seal the interior of the parts of my system and to thereby prevent the ingress of air. Another and important feature of my invention is the provision of a one-way pressure sealed valve between the pump and the accumulator to allow flow of fluid from the pump to the accumulator but not from the accumulator to the pump, the by-pass controlling device being connected to the pump-accumulator conduit on the pump side of the one-way valve in order that fluid under pressure from the accumulator may not leak past the piston which forms a part of the by-pass controlling device. Other advantages, objects and features of my invention will become apparent during the course of the ensuing description, reference being had therein to the accompanying drawings, in which;

Figure 1 shows diagrammatically a fluid pressure control system which incorporates my invention;

Figure 2 is a plan view of the combined motor control device and by-pass valve which constitutes the outstanding feature or part of my invention;

Figure 3 is a section taken on the line 3—3 of Figure 2;

Figure 4:
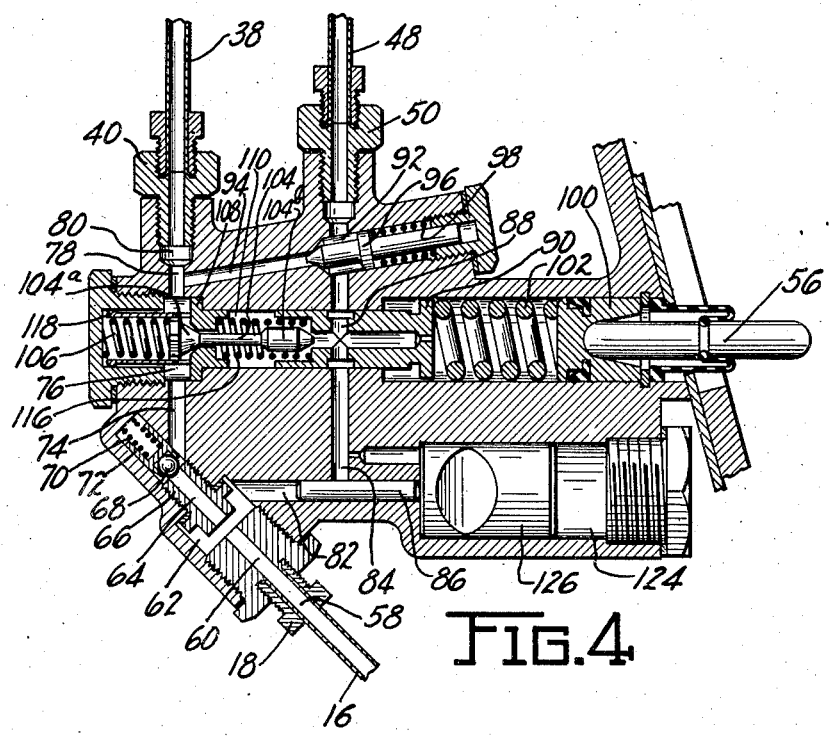
Figure 4 is a section taken on the line 4—4 of Figure 2.

In Figure 1 my accumulator system is illustrated as it might be used in operating a hydraulic brake or brakes for an automotive vehicle. It will be obvious that my invention is equally applicable in the operation of any hydraulic or fluid controlled motor, whether the said motors be used to operate brakes, clutch, throttle, gear shift on automotive vehicles, or any of the various hydraulically controlled units used in connection with aircraft.

A fluid reservoir 10 is connected by a line 12 to a pump 14. The pump 14 may be driven in any suitable manner, as, for example, by connection with the drive shaft of an automotive vehicle. The pump 14 is connected by a line 16 to a fitting 18 which is secured to a combined motor control and by-pass valve element indicated generally by the numeral 20. A fitting 22 connects one end of a line 24 with the valve device 20, the other end of the line 24 being connected to a conventional wheel cylinder 26 for operating a brake indicated generally by the numeral 28. A fitting 30 connects one end of a line 32 to the valve device 20, and the other end of the line 32 is connected to a hydraulic motor 34 arranged to operate brake 36. A conduit 38 connects a fitting 40 on the valve device 20 to an accumulator 42, said accumulator serving to hold the quantity of fluid placed under pressure by the pump 14 until such time as the fluid under pressure is utilized in applying the brakes 28 and 36. A pressure gauge 44 is connected by a conduit 46 to the accumulator and serves to apprise the operator of the vehicle of the amount of pressure available. A conduit 48 connects the valve device 20 to the reservoir 10, the conduit being secured to the valve device by a fitting 50. A treadle or manually operable pedal 52 is pivoted at 53 adjacent the floor board 54 of the vehicle and has a rod 56 extending into the interior of the valve device 20 for operating the brakes of the vehicle, as will hereinafter be explained.

Figure 5:
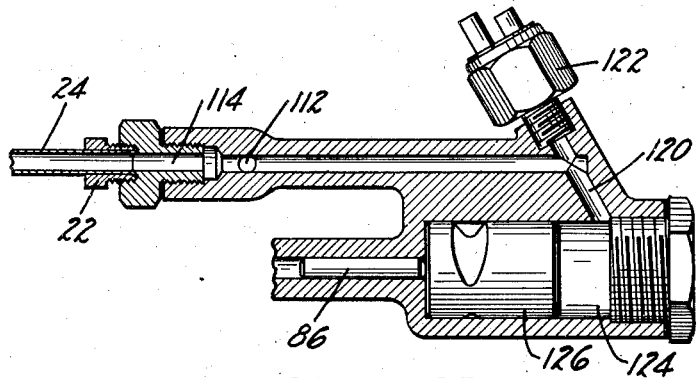
Figure 5 is a section taken on the line 5—5 of Figure 2.

The valve device 20 is shown in detail in Figures 2 to 5 inclusive. The device 20 may conveniently be made in a single casting operation. It may thus constitute a single substantially solid piece having a number of passages and chambers therein. A port 58 opens, through the fitting 18, into the conduit 16 and is therefore adapted to receive at all times fluid under pressure from the pump 14. This pressure fluid, entering the valve device 20 through the port 58, moves along a passage 60 into a small chamber 62 thence into a passage 64 in an externally threaded fitting 66 and against the bottom of a ball valve 68 which is urged to seat at one end of the passage 64. A light spring 70, bearing against a cage 72 which in turn bears against the ball valve 68, serves to move the valve 68 to its seat closing the passage 64 whenever there is exceptionally light pressure on the fluid coming from the pump. Whenever the pressure in the accumulator exceeds the pressure on the delivery side of the pump, the accumulator pressure will itself hold valve 68 seated, the seal effected by the valve being a pressure seal and therefore very effective. If the pump is operating under even a slight load, the pressure of the fluid will normally be sufficient to move the ball valve 68 from its seat and allow the passage of the fluid through a conduit 74 into a small chamber 76 and from that chamber through a passage 78 to a port 80 and thence past the fitting 40 into the line 38 which leads to the accumulator 42.

Pressure fluid in the chamber 62 would pass through a passage 82, into a cross passage 84 except for a piston or plunger 86 which at times blocks the passage 82. The piston 86 is part of a by-pass control device which constitutes a focal point of my invention, and which will subsequently be carefully described. During the period when the vehicle brakes are released, the passage 84 is connected to the reservoir through a passage 88 in a plunger 90 which is part of the valve device for controlling operation of the brakes. Passage 88 connects passage 84 to a small chamber 92 which in turn opens, through the fitting 50, to reservoir conduit 48. A passage 94 connects the accumulator passage 78 to a pressure release device which comprises a valve member 96, normally seated at the end of passage 94 to close the said passage, and a spring 98 holding the valve member seated. When the accumulator pressure becomes so high that, acting against the small area of the valve member 96 at the opening of passage 94, it is sufficient to overcome the spring 98, pressure fluid will be allowed to escape from the accumulator side of the system and thus prevent damage to the accumulator owing to excessive pressure.

The valve device for controlling operation of the brakes or other motor operated units comprises a piston 100 movable by the treadle controlled rod 56, the plunger 90, a spring 102 compressed between the plunger 90 and the piston 100, and a valve element 104 which controls the connecting of the motors 26 and 34 alternately to the accumulator and to the reservoir. In the position shown in Fig. 4, the valve element 104, which in reality constitutes two valves, 104a and 104b, is biased by a spring 106 to seat its valve 104 against an obstructing member 108 and thereby prevent fluid flow between the accumulator-connected chamber 76 and an interior chamber 110 between the member 108 and the plunger 90. The chamber 110 is connected by a passage 112 (see broken line passage in Fig. 2) to the conduit 32 which leads to motor 34. Intermediate its ends, passage 112 connects through passage 114 with conduit 24 which leads to motor 26 (see Fig. 5). The chamber 110 may thus be considered the motor chamber of the system, inasmuch as it is at all times connected to the motors which operate the brakes. Referring again to Fig. 4, valve element 104, when in released position as shown, has its valve 104b separated from the plunger 90, so that the chamber 110 is connected to the reservoir. A spring 116 in chamber 110 urges the plunger 90 toward released position. At the left end of valve element 104, which constitutes valve 104a, an alignable guide member 118 is provided, shaped to allow proper alignment of the valve element 104 with its cooperating valve seats, but to at the same time, guide the valve element 104 in its reciprocable movements. Passage 114, it should be noted, extends past its junction with passage 112 (see Fig. 5) to intersect cross passage 120. The passage 120 at one end leads to a pressure controlled hydraulic stop light switch 122 of the usual type, and at its other end leads to a chamber 124.

The by-pass device which regulates the alternate connecting of the pump to the accumulator and to the reservoir will now be specifically described. The device may be seen clearly in Figures 3, 4, and 5. It comprises the small piston 86 (already mentioned) which is reciprocable in passage 82, and a large piston 126 which is reciprocable in the chamber 124. The piston 86 is at all times subjected to the pressure prevailing in the connection between the pump and the accumulator, which pressure tends to move the piston 86 in the direction of the large piston 126. The piston 126 is a all times subjected to the pressure prevailing in chamber 110 and likewise in motors 26 and 34, which pressure tends to move piston 126 in the direction of the small piston 86. Movements of the piston 126 are subjected to snap action by means of a toggle device comprising a pair of thrust rods 128 which bear against opposite sides of piston 126, extending into grooves therein, a pair of spring loaded plungers 130 against which the thrust rods 128 bear, and a pair of springs 132 which urge the plungers 130 toward the large piston 126. When the piston 126 is in the position shown in Fig. 3, the springs 130 exert considerable force tending to hold piston 126 at rest. When sufficient force is exerted against piston 86 to move piston 126 against whatever pressure may exist in chamber 124 and against the resistance of the spring loaded toggle device, the resistance of the toggle device to movement of piston 126 will increase until the thrust rods 128 are straightened out, i. e., are on a line with one another. Then the toggle device will assist piston 86 in moving piston 126.

Operation of my fluid pressure system is substantially as follows. As long as the piston 86 blocks passage 82, operation of the pump 14 will build up pressure in the accumulator 42. This pressure constantly tends to move piston 86 against piston 126. Whenever the pressure created by the pump against piston 86 is sufficient to overcome the force exerted by springs 132 and thrust toggle device 128, the piston 86 will be moved with a quick action to open passage 84 to passage 82, thereby connecting the pump to reservoir 10. Since ball valve 68 will now be forced against its seat by the accumulator pressure, the accumulator will be disconnected from the pump and the pump will be loaded only by reservoir or atmospheric pressure. The pump will not be again connected to the accumulator until the brake applying motors have been actuated. When it is desired to actuate the said brake applying motors the operator will depress the member 52 moving piston 100 to exert through spring 102 a force tending to move plunger 90, first seating valve 104b, thus disconnecting chamber 110 from the reservoir and then unseating valve 104a, thus connecting chamber 110 to the accumulator to admit fluid under accumulator pressure to the motors 26 and 34, applying the brakes. The fluid from the accumulator when admitted to chamber 110 will exert a force tending to move plunger 90 back to its released position with the result that a reaction or feel will be created, giving the operator an indication of the amount of pressure which is being exerted to apply the brakes. When the reaction is sufficient, valve 104a will be closed, and since 104b remains closed, the brake applying valve is in lapped position. To reopen valve 104a and thus increase the brake applying pressure it will be necessary for the operator to exert greater pressure on piston 100 and at the same time it will be necessary for the operator to move piston 100 in a direction to further compress spring 102. This compressibility of spring 102 provides for follow-up. It will be noted that initial movement of plunger 90 closes passage 88, thus cutting off the bypass and forcing the buildup of pressure in the accumulator even though bypass valve 86 may be open. Because of this feature, it is possible for the operator to charge a fully discharged accumulator by actuating the plunger 90 and holding it in the forward position until pressure in the accumulator and in the motor builds up sufficiently to move large piston 126 to the left.

As long as chamber 124 is connected through chamber 110 to the reservoir the pressure against piston 126 is not sufficient to overcome the force of springs 132 which, it will be remembered, are now exerting a force tending to hold piston 126 away from piston 86. As soon as fluid from the accumulator is admitted to chamber 110 it is admitted also to chamber 124 and exerts a pressure on piston 126 tending to move the said piston in the direction of piston 86. Owing to the large diameter of piston 126, a comparatively small pressure in chamber 124 will overcome the force exerted by springs 132 and piston 126 will be snapped back to the position in which it forces piston 86 to obstruct passage 82. A venting passage connects the left side of piston 126 with the reservoir. It is contemplated that any brake application of normal severity will be sufficient to move pistons 126 and 86 to close the passage 82 and cut off the by-pass. The pump will now again be connected to the accumulator and will build up pressure in the accumulator until such time as the pressure once again acts through the passage 86 to overcome pressure exerted by the toggle device.

While a single illustrative embodiment of my device has been described, it will be obvious that there are innumerable uses to which my invention can be put and that it may be embodied in innumerable forms. It is therefore my intention that the scope of my invention be limited, not by the description of this embodiment, but only by the terms of the appended claims.

I claim:

1. A fluid pressure system comprising an accumulator for storing fluid under pressure, a pump connected to the accumulator for building up pressure in the accumulator, a reservoir, a connection between the pump and the reservoir and constructed and arranged to allow the pump to take fluid from the reservoir and by-pass the fluid to the reservoir when the pump discharge pressure exceeds a given amount, and means for controlling the connection between the pump and the reservoir including a small plunger which is at times subjected to pump discharge pressure, a large plunger opposing the small plunger and at times subjected to partial accumulator pressure, and a toggle device at times opposing the small plunger and at times opposing the large plunger according to the positions of the plungers.

2. A fluid pressure system comprising an accumulator for storing fluid under pressure, a pump connected to the accumulator for building up pressure in the accumulator, a reservoir, a connection between the pump and the reservoir and constructed and arranged to allow the pump to take fluid from the reservoir and by-pass the fluid to the reservoir when the pump discharge pressure exceeds a given amount, and means for controlling the connection between the pump and the reservoir including a small plunger which is at times subjected to the pump pressure, a large plunger opposing the small plunger and at times subjected to partial accumulator pressure, and a toggle device at times opposing the small plunger and at times opposing the large plunger according to the positions of the plungers.

3. A fluid pressure system comprising an accumulator for storing fluid under pressure, a pump connected to the accumulator for building up pressure in the accumulator, a reservoir, a connection between the pump and the reservoir which allows the pump to take fluid from the reservoir and by-pass the fluid to the reservoir when the pump discharge pressure is higher than a given amount, and means for controlling the connection between the pump and the reservoir including a small plunger which is at times subjected to pump discharge pressure and which serves as a valve for opening and closing the bypass, a large plunger opposing the small plunger and at times subjected to partial accumulator pressure, and a toggle device at times opposing the small plunger and at times opposing the large plunger according to the positions of the plungers.

4. A fluid pressure system comprising an accumulator for storing fluid under pressure, a pump connected to the accumulator for building up pressure in the accumulator, a reservoir, a connection between the pump and the reservoir which allows the pump to take fluid from the reservoir and by-pass the fluid to the reservoir when the pump discharge pressure is higher than a given amount, and means for controlling the connection between the pump and the reservoir including a small plunger which is at times subjected to pump discharge pressure and which serves as a slide valve opening and closing the bypass, and a large plunger opposing the small plunger and at times subjected to partial accumulator pressure, said large plunger being resisted in its initial movement by a flexible means acting on said plunger.

5. A fluid pressure system comprising an accumulator for storing fluid under pressure, a pump connected to the accumulator for building up pressure in the accumulator, a one-way check valve between the pump and the accumulator urged to close by accumulator pressure, a reservoir, a connection between the pump and the reservoir which allows the pump to take fluid from the reservoir and by-pass the fluid to the reservoir when the pump discharge pressure is higher than a given amount, and means for controlling the connection between the pump and the reservoir including a small plunger which is at times subjected to pump discharge pressure and which serves as a valve for opening and closing the bypass, a large plunger opposing the small plunger and at times subjected to partial accumulator pressure, and a toggle device at times opposing the small plunger and at times opposing the large plunger according to the positions of the plungers.

6. A fluid pressure system comprising an accumulator for storing fluid under pressure, a pump connected to the accumulator for building up pressure in the accumulator, a one-way check valve between the pump and the accumulator urged to close by accumulator pressure, a reservoir, a connection between the pump and the reservoir which allows the pump to take fluid from the reservoir and by-pass the fluid to the reservoir when the pump discharge pressure is higher than a given amount, and means controlling the connection between the pump and the reservoir including a small plunger which is subjected to the pressure on the delivery side of the pump, and which serves as a slide valve controlling the bypass, and a larger plunger opposing the small plunger and at times subjected to partial accumulator pressure, said large plunger being resisted in its initial movement by a flexible means acting on said plunger.

7. A fluid pressure system comprising an accumulator for storing fluid under pressure, a pump connected to the accumulator for building up pressure in the accumulator, a one-way check valve between the pump and the accumulator urged to close by accumulator pressure, a reservoir, a connection between the pump and the reservoir which allows the pump to take fluid from the reservoir and by-pass the fluid to the reservoir when the pump discharge pressure is higher than a given amount, and means for controlling the connection between the pump and the reservoir including a small plunger which is subjected to the pressure on the delivery side of the pump, and a large plunger opposing the small plunger and at times subjected to partial accumulator pressure, said large plunger being resisted in its initial movement by a flexible means acting on said plunger.

8. A fluid pressure system comprising a fluid operated motor, an accumulator for storing fluid under pressure, a pump connected to the accumulator for building pressure in the accumulator, a one-way check valve between the pump and the accumulator which is urged to close by accumulator pressure, a control valve for connecting the accumulator to the motor to operate the motor, a bypass for connecting the outlet side of the pump to a pressure differing from accumulator pressure, means for automatically controlling the bypass having an area subjected to the pressure prevailing on the delivery side of the pump and a larger area subjected to the pressure prevailing in the motor whenever the valve is actuated to cause operation of the motor, said means including a device which yieldably opposes the pressure against the smaller area so long as the bypass is closed thereby causing the accumulator pressure to build up before the bypass is opened, and means associated with the control valve for cutting off the bypass whenever the motor is actuated thus causing an initial buildup of pressure in the accumulator and in the motor.

9. A fluid pressure system comprising a fluid operated motor, an accumulator for storing fluid under pressure, a pump connected to the accumulator for building pressure in the accumulator, a one-way check valve between the pump and the accumulator which is urged to close by accumulator pressure, a control valve for connecting the accumulator to the motor to operate the motor, a bypass for connecting the outlet side of the pump to a pressure differing from accumulator pressure, means for automatically controlling the bypass having an area subjected to the pressure prevailing on the delivery side of the pump and a larger area subjected to the pressure prevailing in the motor whenever the valve is actuated to cause operation of the motor, and means associated with the control valve for cutting off the bypass whenever the motor is actuated thus causing an initial buildup of pressure in the accumulator and in the motor.

10. A fluid pressure system comprising a fluid operated motor, an accumulator for storing fluid under pressure, a pump connected to the accumulator for building pressure in the accumulator, a one-way check valve between the pump and the accumulator which is urged to close by accumulator pressure, a control valve for connecting the accumulator to the motor to operate the motor, a bypass for connecting the outlet side of the pump to a pressure differing from accumulator pressure, means for automatically controlling the bypass according to the pressure prevailing on the delivery side of the pump and the pressure prevailing in the motor, the pressure prevailing on the delivery side of the pump opposing the pressure prevailing in the motor and means associated with the control valve for cutting off the bypass whenever the motor is actuated thus causing an initial buildup of pressure in the accumulator and in the motor.

11. A fluid pressure system comprising an accumulator for storing fluid under pressure, a pump connected to the accumulator for building up pressure in the accumulator, a reservoir, a connection between the pump and the reservoir which allows the pump to take fluid from the reservoir and by-pass the fluid to the reservoir when the pump discharge pressure is higher than a given amount, a plunger which serves as a slide valve opening and closing the bypass and which also serves as a pressure responsive control for the bypass, said plunger having a relatively small area subjected to pump discharge pressure and a relatively large opposed area subjected at times to partial accumulator pressure, and a toggle device associated with the plunger which serves to give said plunger a snap action when it moves from one position to the other and which also serves, by opposing the pump discharge pressure when the bypass is closed, to cause said accumulator pressure to build up to a predetermined amount.

12. For a hydraulic system having an accumulator, reservoir, pump and motor; a regulator valve comprising a first passageway for connecting the pump to the reservoir, a first piston for controlling communication in the first passageway and subject to pump discharge pressure, a second piston larger than the first piston and opposed thereto, a second passageway for connecting the pump to the accumulator, a chamber communicating with the motor and one end of said second piston, said passageways arranged with respect to the chamber to communicate therewith at times, valve means controlling the communication from the chamber to the passageways, and means for actuating the valve means to communicate the chamber with the second passageway and close communication between the chamber and the first passageway, whereby said first piston is moved to close said first passageway.

13. For a hydraulic system having an accumulator, reservoir, pump and motor; a regulator valve comprising a first passageway for connecting the pump to the reservoir, a first piston for controlling communication in the first passageway and subject to pump discharge pressure, a second piston larger than the first piston and opposed thereto, a second passageway for connecting the pump to the accumulator, a chamber communicating with the motor and one end of said second piston, said passageways arranged with respect to the chamber to communicate therewith at times, valve means, including means for controlling communication in the first passageway, for controlling communication from the chamber to the passageways, and means for actuating the valve means to close communication in the first passageway when said first piston has moved to a position tending to establish communication through said first passageway, whereby hydraulic fluid is caused to flow in said second passageway.

14. For a hydraulic system having an accumulator, reservoir, pump and motor; a regulator valve comprising a first passageway for connecting the pump to the reservoir, a first piston for controlling communication in the first passageway and subject to pump discharge pressure, a second piston larger than the first piston and opposed thereto, yieldable members acting on said second piston tending to resist movement thereof by the first piston, a second passageway for connecting the pump to the accumulator, a chamber communicating with the motor and one end of said second piston, said passageways arranged with respect to the chamber to communicate therewith at times, valve means, including means for controlling communication in the first passageway, for controlling communication from the chamber to the passageways, and means for actuating the valve means to close communication in the first passageway when said first piston has moved to a position tending to establish communication through said first passageway, whereby hydraulic fluid is caused to flow in said second passageway.

RICHARD T. BURNETT.